(12) United States Patent
Barstz et al.

(10) Patent No.: US 9,385,521 B2
(45) Date of Patent: Jul. 5, 2016

(54) COMMUNICATION DEVICE FOR AN ELECTRICAL PANEL HAVING A SWITCH DEVICE

(75) Inventors: Daniel Barstz, Grenoble (FR); Erick Contini, Meylan (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 598 days.

(21) Appl. No.: 13/994,007

(22) PCT Filed: Nov. 14, 2011

(86) PCT No.: PCT/FR2011/000604
§ 371 (c)(1),
(2), (4) Date: Jun. 13, 2013

(87) PCT Pub. No.: WO2012/080587
PCT Pub. Date: Jun. 21, 2012

(65) Prior Publication Data
US 2013/0278082 A1    Oct. 24, 2013

(30) Foreign Application Priority Data
Dec. 16, 2010    (FR) .................................... 10 04912

(51) Int. Cl.
*H02H 3/02*    (2006.01)
*H02B 1/36*    (2006.01)
*H04L 12/40*   (2006.01)

(52) U.S. Cl.
CPC .  *H02H 3/02* (2013.01); *H02B 1/36* (2013.01); *H04L 12/40169* (2013.01); *Y10T 307/826* (2015.04)

(58) Field of Classification Search
None
See application file for complete search history.

(56) References Cited

U.S. PATENT DOCUMENTS

2005/0125083 A1\*    6/2005    Kiko ...................... G05B 15/02
                                                                   700/19
2006/0293190 A1     12/2006    Watson et al.

FOREIGN PATENT DOCUMENTS

WO    WO 2007/016253 A1    2/2007
WO    WO 2009/014581 A1    1/2009

\* cited by examiner

*Primary Examiner* — Jared Fureman
*Assistant Examiner* — Aqeel Bukhari
(74) *Attorney, Agent, or Firm* — Steptoe & Johnson LLP

(57) ABSTRACT

An electrical panel having an unpluggable drawer unit that forms a housing for positioning an electrical device, and an Ethernet-type high-frequency communication device that forms a daisy-chain communication subsystem, the one drawer unit including an unpluggable connector to connect or disconnect it to a communication subsystem, and the drawer unit can occupy a first, plugged-in position connected to the communication subsystem, and it comprises a switch that controls a bypass switch of a bypass on the communication subsystem when the drawer unit occupies a second, unplugged position.

12 Claims, 4 Drawing Sheets

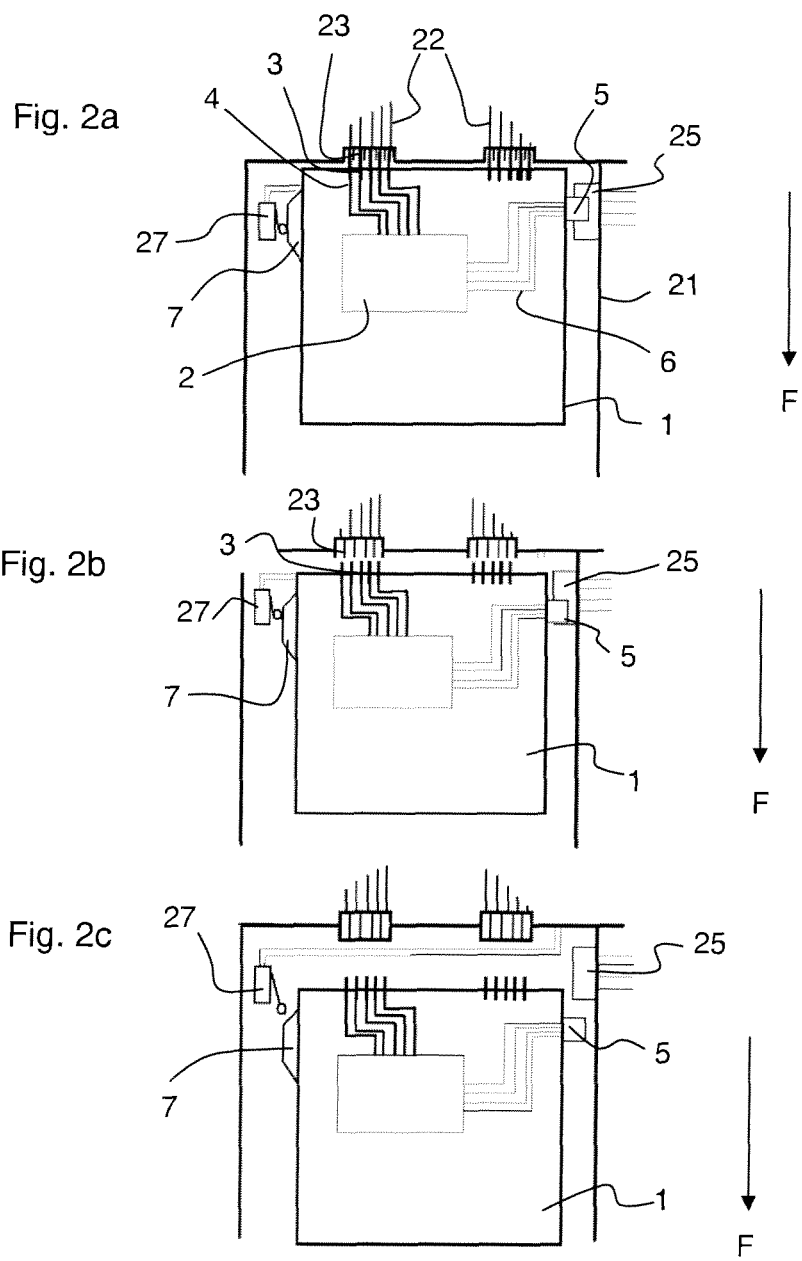

COMMUNICATION DEVICE FOR AN ELECTRICAL PANEL HAVING A SWITCH DEVICE

This application is a national stage entry of International Application No. PCT/FR2011/000604, filed Nov. 14, 2011, designating the U.S., and which claims the benefit of French Application No. 10-04912, filed Dec. 16, 2010.

TECHNICAL FIELD

The present invention relates to a communication device for an electrical panel, particularly suitable for Ethernet-type electrical devices that communicate at a high transmission frequency. It also relates to an electrical panel as such that comprises a communication device of this type. Finally, it relates to a drawer unit of an electrical panel of this type.

PRIOR ART

It is known practice to dispose various electrical devices in drawer units of an electrical panel, so as to be able to facilitate the maintenance operations by simply taking action on each of these electrical devices of the electrical panel by simply opening a drawer unit. When a drawer unit is opened in this manner, the electrical connection of the electrical device is automatically cut, by means of what is known as an unpluggable link that is arranged between the drawer unit and the electrical panel. An operator is thus able to take action on the electrical device that the unplugged drawer unit comprises in total safety, while the other electrical devices of the electrical panel continue to operate normally.

However, the various electrical or electronic devices of a system are often communicating today, and are linked to one another by Ethernet-type high-frequency communication means. A common solution to allow them to communicate in this manner involves connecting them by means of a daisy-chain link, in which each electrical or electronic device is connected solely and directly to two upstream and downstream devices. This daisy-chain link may also be closed. It is thus referred to as a daisy-chain loop. The special feature of such a communication subsystem stems from the fact that the communication data pass through the whole subsystem, through all of the electrical devices of the system. In the case of a simple daisy-chain, if a single one of these electrical or electronic devices is defective, or its link to the communication subsystem broken, then the whole of the communication subsystem downstream stops operating and none of the electrical or electronic devices that are downstream are able to receive or transmit communication data any longer. In the case of a daisy-chain loop, the devices that are downstream will be able to continue to communicate. However, if a second device stops operating, all of the devices that are between the two stopped devices will stop communicating.

To overcome a disadvantage of this type, the document WO 2007/016253 describes a solution in which a bypass switch is associated with each electrical or electronic device in order to create a bypass route so as to skirt an electrical or electronic device when it is defective or intentionally withdrawn and to allow the other electrical or electronic devices to remain in communication by maintaining the closed communication subsystem by separating the defective or withdrawn electrical or electronic device. However, this situation does not concern electrical devices that are disposed in an electrical panel and does not allow the advantageous maintenance operations that are provided by such an architecture in an electrical panel.

SUMMARY OF THE INVENTION

Thus, the object of the invention is to propose an architecture solution for a system comprising a plurality of communicating electrical devices that allows user-friendly and easy maintenance of said devices and that does not have any or some of the disadvantages of the prior art.

A communication device for an electrical panel according to the invention comprises at least one switch that controls a switching device in order to bypass a high-frequency or high-speed communication subsystem, the switch being capable of cooperating with an unpluggable drawer unit of an electrical panel in order to control the switching device on the basis of the position of the drawer unit.

Advantageously, the switch is a microswitch of small size.

Preferably, the switch controls at least one electromechanical or electronic relay, the contacts of which allow the wires of the communication subsystem to be switched.

Preferably, the communication subsystem transmits data at a rate ranging at least up to 100 Mbits/s.

In one preferred embodiment, the device comprises sliding contacts at the level of the wires of the communication subsystem in order to allow contact to be maintained with the communication subsystem in an intermediate test position of a drawer unit of the electrical panel.

In one particular embodiment, the device comprises at least one earth strand disposed between two communication strands of the communication subsystem at the level of the sliding contacts in order to reduce crosstalk at high data transmission frequencies.

An electrical panel according to the invention comprising at least one unpluggable drawer unit that forms a housing for positioning an electrical device comprises an Ethernet-type high-frequency communication device as defined above that forms a daisy-chain communication subsystem, wherein the at least one drawer unit comprises an unpluggable connector in order to connect it or not to connect it to the communication subsystem, wherein the at least one drawer unit can occupy a first, plugged-in position in which it is connected to the communication subsystem, and wherein it comprises a switch that is integral with the electrical panel and that controls a bypass switch so as to form a bypass on the communication subsystem when the drawer unit occupies a second, unplugged position.

Advantageously, the switch is disposed on the chassis opposite a lateral face of the drawer unit, and the latter comprises a cooperating element that cooperates with the switch.

Preferably, the switch is in a closed position when the drawer unit occupies a first, normal operation position in which its cooperating element cooperates with the switch and the switch is in an open position when the drawer unit occupies a second, open position in which its cooperating element no longer cooperates with the switch.

In one particular embodiment, the panel comprises a sliding link at the level of a lateral face of the unpluggable drawer unit, through which the communication subsystem passes, so as to link the drawer unit to the communication subsystem in the first, normal operation position of the drawer unit and in a second, intermediate test position in which the drawer unit is slightly open, and to disconnect the drawer unit from the communication subsystem in an unplugged position of the drawer unit, the switch being disposed relative to the drawer unit so as to control the bypass of the communication subsystem more or less at the same time as the sliding link is disconnected, within a period of less than or equal to 10 ms.

Advantageously, the panel comprises an unpluggable power connection disposed at the back of the drawer unit.

A drawer unit according to the invention for an electrical panel as defined above comprises an unpluggable communication connector for an Ethernet-type high-frequency communication subsystem and a cooperating element capable of cooperating with a control switch for a switching device of the communication subsystem.

BRIEF DESCRIPTION OF THE DRAWINGS

These objects, features and advantages of the present invention will be explained in detail in the description that follows for a particular embodiment provided in nonlimiting fashion in relation to the appended figures, in which:

FIGS. 2a to 2c show three different positions for a drawer unit of an electrical panel according to an embodiment of the invention.

DETAILED DESCRIPTION OF PREFERRED EMBODIMENTS

The concept of the invention involves providing an Ethernet-type high-frequency communication device, forming a daisy-chain-type communication network, within an electrical panel, and providing automatic switching in order to skirt a certain drawer unit of the electrical panel when it is unplugged, in order to keep the communication subsystem operational for the rest of the electrical panel. In some cases, the daisy chain may be looped.

Such a solution has the advantage of combining the user-friendliness of maintenance operations that is provided by an electrical panel while guaranteeing reliable and continuous operation of the communication between the devices, even while a maintenance operation is in progress or when a normal operation in a process requires the intentional unplugging of a functional unit.

Figure 1A:
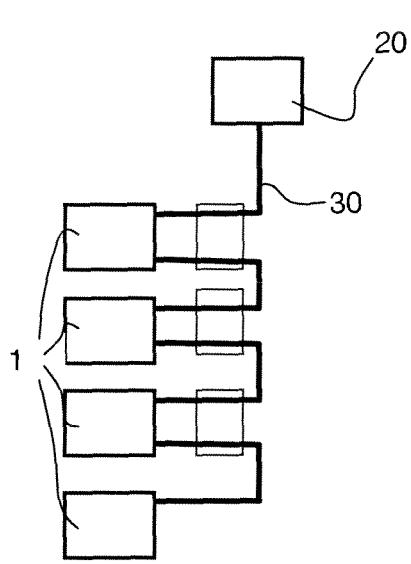
FIGS. 1a to 1c schematically show three steps during the implementation of the concept of the invention.
Figure 1B:
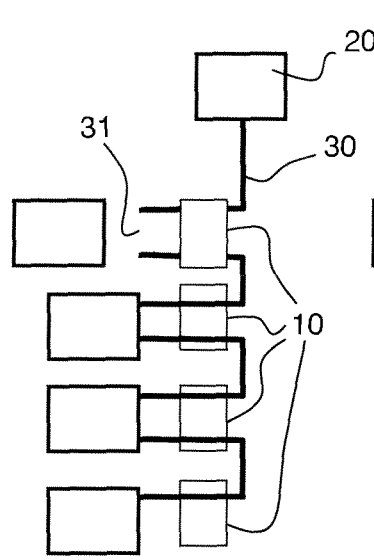
Figure 1C:
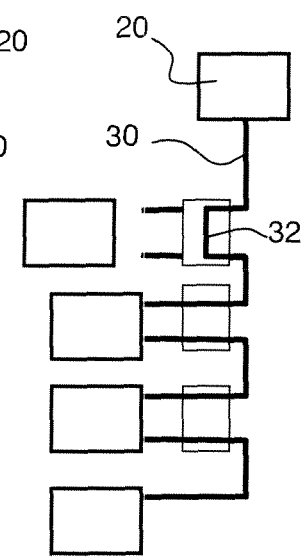

FIGS. 1a to 1c schematically illustrate the implementation of the invention. They show an electrical panel comprising, by way of example, four drawer units 1, each comprising an electrical or electronic device, not shown. When configured for normal operation, as shown in FIG. 1a, all of the drawer units are plugged in, and the four electrical or electronic devices of the electrical panel are linked by an Ethernet-type daisy-chain communication subsystem 30, which is driven by a control element 20 of the electrical panel.

During a maintenance operation on the electrical device disposed in the first drawer unit, the latter is open, which prompts unplugging and hence at the same time disconnection of its electrical power supply, not shown, and of its link to the communication subsystem 30. FIG. 1b shows the intermediate situation, just after the first drawer unit 1 has been opened: the communication subsystem 30 is thus open at the level of its link 31 to the electrical device in the first drawer unit. However, according to the invention, the panel is equipped with a switching device 10 that is associated with each drawer unit 1. When the unplugged position of the first drawer unit 1 is detected, the switching device switches more or less simultaneously in order to form a bypass 32 to restore the communication subsystem 30 and to allow the other electrical devices of the panel to continue to communicate, as per the switched communication subsystem shown in FIG. 1c. The bypass 32 can also be called skirting.

Advantageously, this switching is very rapid, lasting less than 10 ms, in order to allow continuity of the communication subsystem 30 to be guaranteed, to avoid any trouble for the communications in progress, even at a high rate in the order of 100 Mbits/s. At the end of the maintenance operation, the drawer unit 1 is closed again, plugged in again, that is to say that the electrical device that it contains is automatically reconnected and is automatically reintegrated into the communication subsystem, as per the diagram in FIG. 1a, following reverse switching of the switching device 10.

The optimized implementation of the concept of the invention must thus overcome various technical problems, including:

it is necessary to obtain rapid switching of the communication subsystem, as has been explained;
  the unpluggable connection of the electrical device must be sufficiently robust to undergo numerous actuation operations on the drawer unit, for example at least 500 operations;
  the solution must be suitable for operation that is independent of the way in which an operator will maneuver a drawer unit, that is to say must be suitable for various speeds, efforts, etc., when the drawer unit is actuated;
  it must moreover allow large-scale production of electrical panels, and thus be reliable and reproducible.

An optimized embodiment of the invention will now be explained in detail.

FIG. 2a shows a drawer unit 1 comprising an electrical device 2, in a closed, plugged-in configuration for normal operation. This drawer unit 1 is able to be displaced translationally in the direction shown by the arrow F relative to the fixed chassis 21 of the electrical panel. One or more electrical power supplies 22 are arranged within this chassis 21, and routed as far as an unpluggable connection that is made by a first connector 23 provided at the surface of the chassis 21, cooperating with an electrical connector 3 that is arranged at the back of the drawer unit 1. These two power connectors 3, 23 are in the form of male/female "tulip"-type connectors. Naturally, any other unpluggable power connection solution can be used as a variant. Next, the power is finally taken to the electrical device 2 by a power cable 4 from the power connector 3 of the drawer unit 1.

According to the preferred embodiment, the drawer unit 1 can occupy two other positions, shown in FIGS. 2b and 2c, respectively, in which the power connection 3, 23 is broken. The second position, called the "test position", is shown in FIG. 2b; the drawer unit 1 has been slightly opened in the direction F relative to the chassis 21 of the electrical panel. In this test position, the communication link of the electrical device 2 continues to be assured. In the third position, called the "unplugged position", which is shown in FIG. 2c, the power connections, like the communication connections, are unplugged, that is to say open.

In order to implement this operation, the drawer unit 1 is equipped with a sliding-type communication connector 5, which cooperates with a corresponding connector 25 that is fixed to the chassis 21 of the electrical panel, at the level of a lateral face of the drawer unit 1. Next, a communication link 6 is provided from the communication connector 5 of the drawer unit 1 to the electrical device 2. It should be noted that a similar sliding connection can also be implemented for a power connection of the drawer unit.

Moreover, a switch of microswitch type 27 is arranged on the chassis 21 of the electrical panel, for example screwed into the panel, at the level of the other lateral part of the drawer unit 1. The latter is equipped with a cooperating means 7 for the microswitch 27, in the form of a protuberance that juts out from the lateral surface of the drawer unit 1 to prompt actuation of the microswitch in a closed, working position, also called "ON position", in the two normal and test operation positions that are shown in FIGS. 2a and 2b, respectively. This cooperating means 7 may be a metal piece in the form of a trapezium that is integral with the drawer unit. The positioning and shape of this cooperating means 7 are such that they stop actuating the microswitch 27, which thus automatically moves to an open rest position, also called "OFF position", as soon as the sliding communication link 5, 25 is broken. The use of a microswitch for this switch of the electrical panel has the advantages of very rapid switching, of taking up only a little space and of being compatible with a large number of uses.

Figure 3:
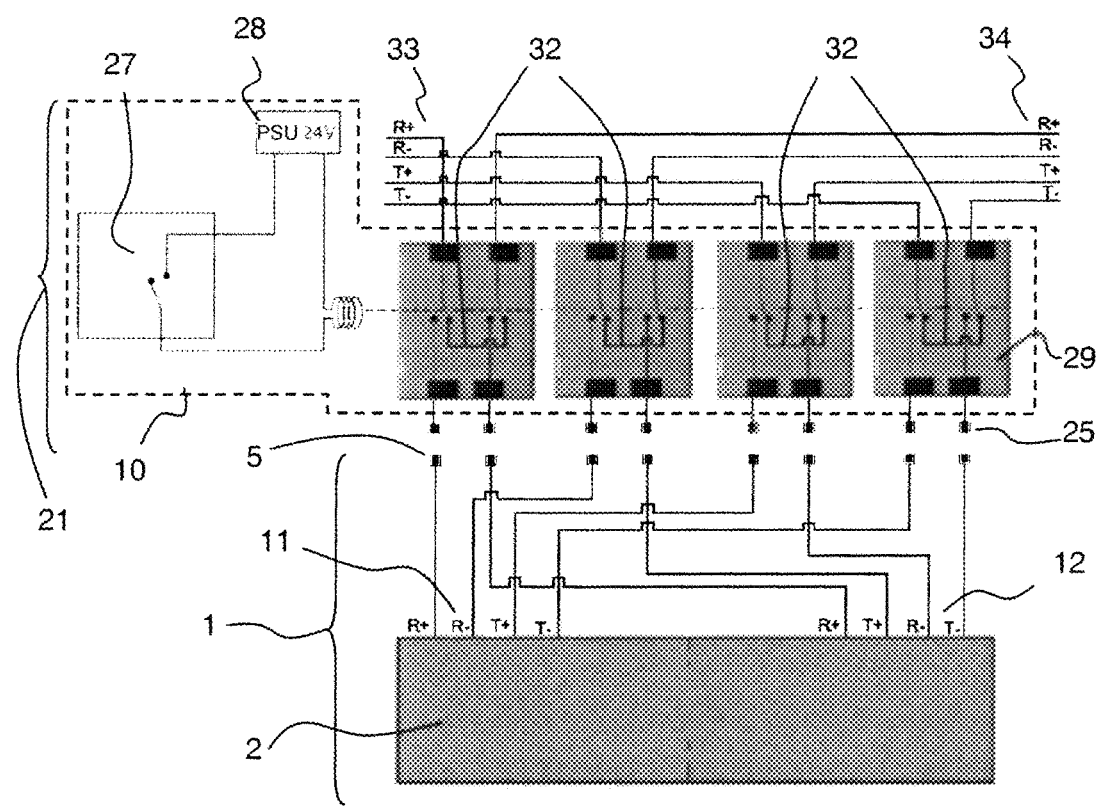
FIG. 3 shows the switching device associated with a drawer unit of the electrical panel according to the embodiment of the invention.

FIG. 3 shows the architecture of the communication subsystem 30 associated with a drawer unit 1 in more detail. In fact, it comprises four communication wires, a first for positive data transmission called T+, a second for negative data transmission called T−, a third for positive data reception called R+ and a fourth for negative data reception called R−. The two transmission wires T+, T− and the two reception wires R+, R− respectively form two distinct communication strands.

An electrical device 2 disposed in the drawer unit 1 comprises an Ethernet-type connector for linking it to the communication subsystem. This connection in fact uses two RJ45-type connectors 11, 12, respectively forming the input and the output of the communication subsystem 30. These connectors can be connected to an electrical circuit breaker. The communication subsystem 30 thus comprises an input 33 coming from an upstream part of the electrical panel and an output 34 towards a downstream part of the electrical panel. Each of the eight wires T+, T−, R+, R− that are necessary for linking the electrical device 2 in the communication subsystem 30 is linked up as per a sliding connection 5, 25 at the level of the interface between the chassis 21 and the drawer unit 1, as has been described previously.

Moreover, a switching device 10 is provided within the electrical panel, allowing the eight wires of the communication subsystem 30 to be acted upon. This switching device 10 first of all comprises the microswitch 27 mentioned previously, a dedicated electrical power supply 28, then a link to electromechanical or electronic relays 29, the contacts of which are used for switching the wires of the communication subsystem, under the control of the microswitch 27.

By way of example, FIG. 3 shows the microswitch in an open or OFF position, which causes the relays to be positioned so as to form bypass links 32 for each of the four wires of the communication subsystem 30, which indeed corresponds to an unplugged position of the drawer unit 1, in which position the sliding connectors 5, 25 of the drawer unit 1 and the chassis 21, respectively, in the electrical panel are separated. This mechanism allows the attainment of a very rapid switching time that is compatible with the high frequencies implemented in Ethernet-type communications.

Moreover, the sliding contacts 5, 25 used at the level of the drawer unit/chassis interface are such that they allow blind connection when the drawer unit 1 is plugged in, that is to say when it is positioned at the back of its slot, in a configuration for normal operation, while continuing to be compatible with the play that exists on account of the mobility of the drawer unit 1, and while offering sufficient mechanical resistance vis-à-vis the mass of the drawer unit and the efforts made when it is maneuvered, in order to endure a large number of these maneuvers, and to react in reliable fashion whatever the speed and manner at/in which a certain operator will maneuver the drawer unit. These sliding contacts are in the form of metal contact strips.

Figure 4:
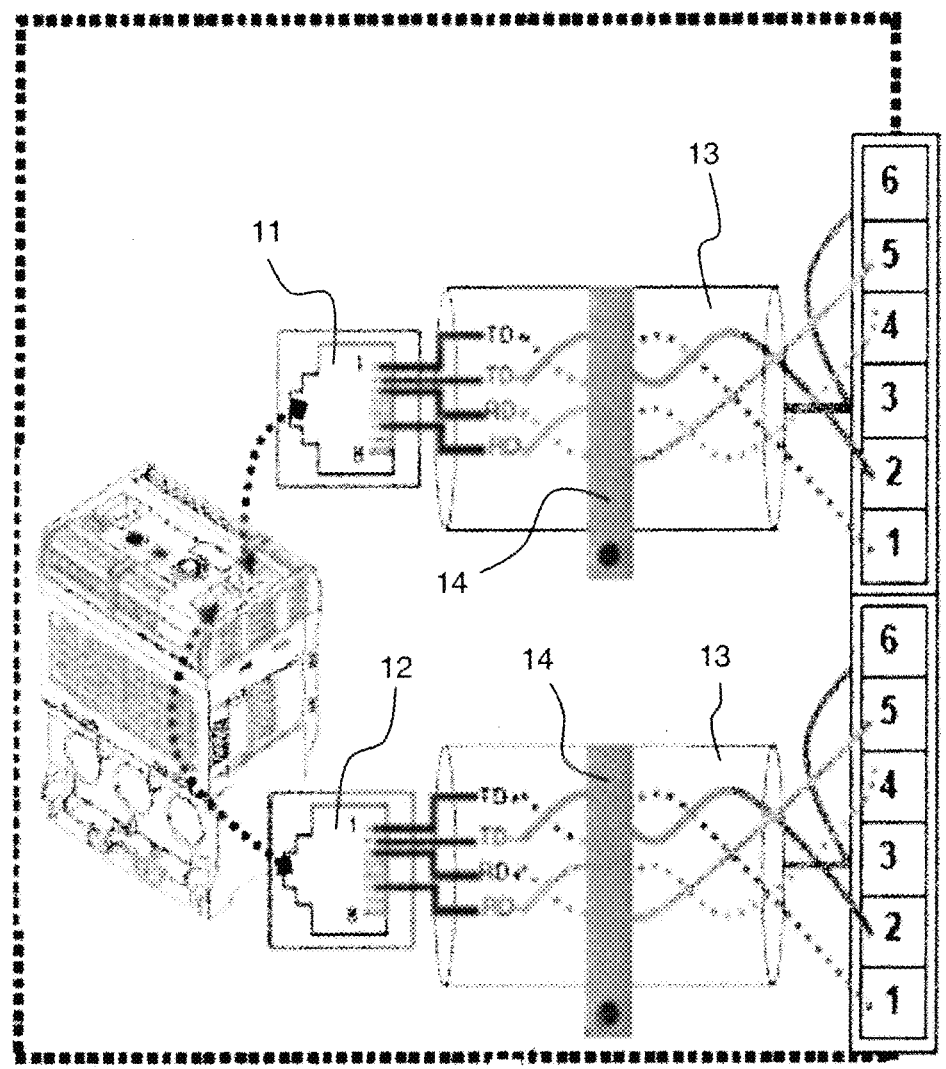
FIG. 4 shows the wiring of the communication subsystem at the level of the drawer unit of the electrical panel according to the embodiment of the invention.

Finally, in order to reduce the crosstalk phenomena that might appear at the level of the sliding connection 5, 25 at high data transmission frequencies, the cabling of the wires of the communication subsystem comprises an earth strand that is inserted between two communication strands T+, T− and R+, R−. FIG. 4 shows this implementation. Each communication link within the drawer unit 1 is made using screened cables 13, which are connected to the earth of the electrical panel by a metal fixing collar 14. Next, these screened cables 13 are connected to the rest of the communication subsystem by six sliding contacts, two of which are for earth signals forming an earth strand, which is inserted between the two communication strands, at the level of the communication connector 5. Thus, the six wires coming from the screened cable 13 forming the communication link 6 within the drawer unit 1 are disposed in the following order at the level of the sliding connector 5: a first wire for positive data transmission T+, a second wire for negative data transmission called T−, a third, earth wire, a fourth wire for negative data reception called R−, a fifth wire for positive data reception called R+ and a sixth, earth wire.

The invention has been described on the basis of a particular electrical panel in nonlimiting fashion. The concept continues to apply to any other communication means, even if it is particularly suited to any Ethernet-type or other high-speed communication means. Moreover, it can be implemented in any electrical panel, whatever the architecture thereof, number of drawer units therein, etc. It should be noted that the drawer units might be provided to occupy just two positions, or more than three positions.

The invention claimed is:

1. A communication device for an electrical panel, which device comprises at least one switch for controlling a switching device to bypass a high-frequency or high-speed communication subsystem, the switch being capable of cooperating with an unpluggable drawer unit of an electrical panel for controlling the switching device as a function of the position of the drawer unit.

2. The communication device for an electrical panel as claimed in claim 1, wherein the switch is a microswitch of small size.

3. The communication device for an electrical panel as claimed in claim 1, wherein the switch controls at least one electromechanical or electronic relay, the contacts of which allow the wires of a communication subsystem to be switched.

4. The communication device for an electrical panel as claimed in claim 1, wherein the communication subsystem is capable of transmitting data at a rate ranging up to 100 Mbits/s.

5. The communication device for an electrical panel as claimed in claim 3, which device comprises sliding contacts at the level of the wires of a communication subsystem for maintaining contact with such a communication subsystem when the drawer unit is in an intermediate test position.

6. The communication device for an electrical panel as claimed in claim 5, wherein said device comprises at least one earth strand between two communication strands of a communication subsystem at the level of the sliding contacts for reducing crosstalk at high data transmission frequencies.

7. An electrical panel comprising at least one unpluggable drawer unit that forms a housing for positioning an electrical device, wherein said panel comprises an Ethernet-type high-frequency communication device as claimed in claim 3, that forms a daisy-chain communication subsystem, the at least one drawer unit comprises an unpluggable connector for connection or disconnection to the communication subsystem, the at least one drawer unit for occupying a first, plugged-in position in which it is connected to the communication subsystem, and comprises a switch that is integral with the electrical panel and for controlling a bypass switch for bypassing the communication subsystem when the drawer unit occupies a second, unplugged position.

8. The electrical panel as claimed in claim 7, wherein the switch is on a chassis opposite a lateral face of the drawer unit which comprises a cooperating element that cooperates with the switch.

9. The electrical panel as claimed in claim 8, wherein the switch is in a closed position when the drawer unit occupies a first, normal operation position in which its cooperating element cooperates with the switch, and the switch is in an open position when the drawer unit occupies a second, open position in which its cooperating element does not cooperate with the switch.

10. The electrical panel as claimed in claim 7, wherein said panel comprises a sliding link at the level of a lateral face of the unpluggable drawer unit, through which the communication subsystem passes for linking the drawer unit to the communication subsystem in the first, normal operation position of the drawer unit, and in a second, intermediate test position in which the drawer unit is slightly open, and to disconnect the drawer unit from the communication subsystem in an unplugged position of the drawer unit, the switch being located relative to the drawer unit for controlling bypass of the communication subsystem approximately at the same time as the sliding link is disconnected, within a period of less than or equal to 10 ms.

11. The electrical panel as claimed in claim 7, wherein said panel comprises an unpluggable power connection at the back of the drawer unit.

12. A drawer unit of an electrical panel as claimed in claim 7, wherein it comprises an unpluggable communication connector for an Ethernet-type high-frequency communication subsystem and a cooperating element capable of cooperating with a control switch for a switching device of the communication subsystem.

* * * * *